United States Patent Office 3,567,775
Patented Mar. 2, 1971

3,567,775
PROCESS FOR THE PREPARATION OF CYCLO-PROPANECARBOXYLIC ACID FLUORIDE
Robert E. A. Dear, Convent Station, and Everett E. Gilbert, Morristown, N.J., assignors to Allied Chemical Corporation, New York, N.Y.
No Drawing. Filed May 8, 1967, Ser. No. 636,587
Int. Cl. C07c *51/58*
U.S. Cl. 260—544                                                26 Claims

ABSTRACT OF THE DISCLOSURE

This application relates to a novel process for the preparation of cyclopropanecarboxylic acid fluoride. This process involves first reacting an alkali metal fluoride selected from the group consisting of potassium, cesium, rubidium and sodium fluoride with a halobutyryl halide having the formula $X(CH_2)_3COX'$, where X and X' are halogens independently selected from the group consisting of chlorine and bromine. The resultant halobutyryl fluoride compound, $X(CH_2)_3COF$, is then reacted at a temperature above at least about 190° F. with an alkali metal fluoride selected from the group consisting of potassium, cesium and rubidium fluoride to produce cyclopropanecarboxylic acid fluoride. The two steps of this process are preferably carried out substantially simultaneously by conducting the first reaction above about 190° C. with an alkali metal fluoride selected from the group consisting of potassium, cesium and rubidium fluoride. Under these conditions the second reaction proceeds substantially simultaneously with the first.

BACKGROUND OF THE INVENTION

Field of the invention

This application relates to processes for the preparation of cyclopropanecarboxylic acid fluoride.

Description of the prior art

Cyclopropanecarboxylic acid fluoride is useful as an intermediate for the preparation of certain anilides of cyclopropanecarboxylic acid which are useful as herbicides as disclosed by French Pat. No. 1,356,497. It can also be used to prepare the ethyl ester of cyclopropanecarboxylic acid, which has been found to have utility as a fumigant as disclosed in U.S. Pat. 3,236,728. Cyclopropanecarboxylic acid fluoride is also useful as a fumigant. However, its specific use as a fumigant forms no part of the present invention.

Cyclopropanecarboxylic acid halides have normally been prepared from cyclopropanecarboxylic acid. The acid used has normally been obtained by first preparing 4-chlorobutyronitrile from 1,3 - propanediol and then treating the 4-chlorobutyronitrile with aqueous sodium hydroxide. This method of preparation is disclosed in Organic Synetheses, Collective Volume III, pp. 221–223, John Wiley and Sons (1955). Cyclopropanecarboxylic acid has also been prepared by two other methods, which are of less practical importance, as disclosed by Organic Synetheses, op. cit. These methods involve the heating of cyclopropanedicarboxylic acid and the action of alkali on ethyl gamma chlorobutyrate.

The above-described method which has normally been used to prepare cyclopropanecarboxylic acid halides has the disadvantages that it requires several steps to achieve the desired cyclopropanecarboxylic acid halide and that the 1,3-propanediol starting material is not commercially available in quantity.

SUMMARY OF THE INVENTION

It is an object of this invention to produce cyclopropanecarboxylic acid fluoride by a process involving fewer steps than the prior art.

It is also an object of this invention to prepare cyclopropanecarboxylic acid fluoride from relatively inexpensive materials which are commercially available in quantity.

Other and further objects of this invention will be apparent to those skilled in the art from a reading of the following specification and claims.

Our novel process comprises the steps of:

(1) reacting an alkali metal fluoride selected from the group consisting of potassium, cesium, rubidium and sodium fluoride with a halobutyryl halide compound having the formula $X(CH_2)_3COX'$, where X and X' are halogens independently selected from the group consisting of chlorine and bromine, to yield a compound having the formula $X(CH_2)_3COF$, wherein X is as defined above, (2) reacting said $X(CH_2)_3COF$ compound with an alkali metal fluoride selected from the group consisting of potassium, cesium and rubidium fluoride at a temperature of at least about 190° C. to form a reaction mixture containing cyclopropanecarboxylic acid fluoride, and (3) recovering the cyclopropanecarboxylic acid fluoride from said reaction mixture.

The halobutyryl halide starting materials used in the first reaction above are known materials, the preparation of which is described in the literature. For example, 4-bromobutyryl chloride can be prepared from the acid as described by Henry, Compt. rend., 1886, 102, 368; 4-bromobutyryl bromide can be prepared from butyrolactone and phoslactone and phosphorous tribromide as described in Biochem. Z. 327, 314–30 (1955); 4-chlorobutyryl chloride, a commercially obtainable material, can be prepared from γ-butyrolactone and thionyl chloride as described in Annalen der Chemie 596, 141 (1955); 4-chlorobutyryl bromide is commercially available from the Dow Chemical Company.

Reaction 1 above can be carried out at atmospheric pressure in the temperature range between about 100° C. and about 189° C., preferably between about 130° to 140° C. The 130° to 140° C. range is preferable because the 4-halobutyryl fluoride so produced will not be contaminated with cyclopropanecarboxylic acid fluoride which might tend to be formed slowly as the temperature approaches 190° C.

The mole ratio of halobutyryl halide to alkali metal fluoride in reaction 1 should be in the range from about 1:1 to about 1:5, preferably between about 1:2 and 1:3. Below about 1:1 the reaction tends to become uneconomical due to insufficient alkali metal fluoride to react with the halobutyryl halide. Above about 1:5 the reaction tends to become uneconomical due to the cost of the excess alkali metal fluoride. The preferred mole ratio range uses sufficient alkali metal fluoride to insure reaction but not so much as to be too expensive.

Reaction 1 is preferably carried out in a solvent in which the alkali metal fluoride used is relatively highly soluble, which has a boiling point sufficiently above the acid fluoride compound to allow separation by distillation and which is relatively inert to the reactants and products. Examples of such solvents are sulfolane (also known as tetramethylene sulfone or tetrahydrothiophen-1,1-dioxide N-methyl - 2 - pyrrolidone, γ - butyrolactone and dimethyl sulfone, with the first two being preferred, particularly sulfolane. The amount of solvent used is not critical but its weight should normally be within the range from about ½ to about 3 times the total weight of the reactants, preferably from about 1 to about 2 times.

After reaction 1 is complete, the halobutyryl fluoride can be separated from the reaction mixture by vacuum distillation (for example at 150 mm. Hg.) Completion of the reaction is believed to take place very quickly, and by using this technique reaction together with recovery can be completed within the range from about 30 minutes to about 3 hours and preferably within about 30 minutes to 1 hour. However, the halobutyryl fluoride need not be separated from the reaction mixture in order to proceed with reaction 2.

Although reaction 1 is preferably carried out at atmospheric pressure, super-atmospheric pressure can be used with obvious modifications of the other reaction parameters. Although some reaction can be obtained at sub-atmospheric pressure, its use tends to make the reaction uneconomical. Although use of a solvent is preferred the reaction can be carried out under increased pressure with no solvent or with a solvent which boils below the reaction temperature by the use of an autoclave.

Reaction 2 above can be carried out at atmospheric pressure in the temperature range between at least about 190° C. and about 240° C. and is preferably carried out between about 195° C. and about 205° C. Below at least about 190° C. little or no cyclic product is obtained, while above about 240° C. the reaction tends to exceed the boiling point of the solvents normally used. The range of about 195 to 205° C. is preferred for economic reasons and to minimize the possibility of thermal decomposition of the product.

The mole ratio of halobutyryl fluoride to alkali metal fluoride in reaction 2 should be in the range from about 1:2 to about 1:10, preferably from about 1:3 to about 1:6. Below about 1:2 the reaction tends to have insufficient alkali metal fluoride to insure good yield and above about 1:10 the reaction tends to become uneconomical due to the cost of the alkali metal fluoride. The preferred mole ratio range uses sufficient alkali metal fluoride to insure good yield but not so much as to tend to become too expensive; also the use of at least about 3 moles of alkali metal fluoride prevents formation of corrosive free hydrogen fluoride by allowing formation of potassium bifluoride.

Reaction 2 is preferably carried out in a solvent in which the alkali metal fluoride used is relatively highly soluble, which has a boiling point sufficiently above that of the cyclic acid fluoride product to allow separation thereof by distillation and which is relatively inert to the reactants and products. Examples of such solvents are sulfolane, N-methyl-2-pyrrolidone, γ-butyrolactone and dimethyl sulfone, with the first two being preferred, particularly sulfolane. The amount of solvent used is not critical but its weight should normally be within the range from about ½ to about 3 times the total weight of the reactants, preferably from about 1 to about 2 times.

The cyclopropanecarboxylic acid fluoride is preferably separated from the reaction mixture by distillation as it is formed. It is preferred to use a nitrogen sweep of the reaction vessel to aid in this separation. Using this technique reaction together with recovery can be completed within the range between about 10 minutes to about 2 hours preferably about 15 to about 30 minutes. Although the reaction is preferably carried out at atmospheric pressure, super-atmospheric pressure can be used if desired, with obvious modifications of the other reaction parameters. Although the use of a solvent is preferred the reaction can be carried out at super-atmospheric pressure without any solvent or with a solvent which boils below the reaction temperature, such as acetonitrile, with the use of an autoclave.

DESCRIPTION OF THE PREFERRED EMBODIMENT

Although our novel process has been described above as two reactions it is preferably carried out under such conditions that the two reactions proceed substantially simultaneously. In order for the reactions to proceed substantially simultaneously the halobutyryl halide and alkali metal fluoride of reaction 1 should be reacted in the temperature range from at least about 190° C. to about 240° C., preferably from at least about 190 to about 205° C. The reaction should preferably be carried out in a solvent having the same characteristics and amount previously set forth with respect to reaction 2, preferably sulfolane. The mole ratio range of halobutyryl halide to alkali metal fluoride should be between about 1:2 to about 1:10, preferably between about 1:3 to about 1:6 for the reasons previously set forth with respect to reaction 2 and the reaction and recovery of the product should be carried out in the same manner and over the same time period set forth previously with respect to reaction 2.

It will be appreciated by those skilled in the art that the ranges discussed in the above paragraphs are determined largely by economic practicability and that some degree of reaction can be obtained over a wide range of conditions including conditions outside the above-described limits.

The preferred method of carrying out the process invention can be illustrated by the following equation:

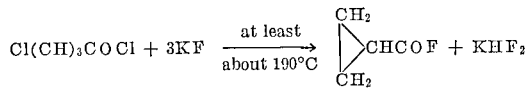

The following examples, in which all parts are by weight, are illustrative of the practice of our invention.

EXAMPLE I

Five hundred five parts of sulfolane were placed in a reaction vessel and heated to 200° C. One hundred parts (1.72 moles) of dry potassium fluoride were added and, with vigorous agitation, one hundred parts (0.71 mole) of 4-chlorobutyryl chloride were added over a twenty minute period. The reaction mixture was refluxed and subsequently the low boiling product was distilled out yielding 43.4 parts of cyclopropanecarboxylic acid fluoride. This was a 69.5% recovery based on the theoretical recovery. The product was redistilled to yield a crystal white liquid of boiling point 81–82° C. and a $N_D^{25}$ of 1.3775. The product showed an infrared spectrum having a strong C=O band at 1842 cm.$^{-1}$. Other diagnostic bands were evident at 1034 and 821 cm.$^{-1}$. This data is in agreement with that of Hanack as reported in Chem. Ber., volume 96, page 2532 (1962). This proton N.M.R. spectrum was also consistent with that for cyclopropanecarboxylic acid fluoride and the structure of the compound was confirmed by preparation of the amide from the acid fluoride and anhydrous ammonia in benzene, yielding a compound having a melting point of 123 to 124° C. in agreement with Dictionary of Organic Compounds, volume 2, page 803.

EXAMPLE II

One hundred parts (0.71 mole) of 4-chlorobutyryl chloride were added to 100 parts (1.72 moles) potassium fluoride in 441 parts of sulfolane at 130° C. After the initial temperature surge had subsided the temperature of the reaction vessel was increased over a three hour period while maintaining vigorous agitation. When the temperature reached 191° C., a rapid distillation began and 55 parts of distillate were collected. Infrared and gas chromatography analyses showed the distillate to be a mixture of 82% cyclopropanecarboxylic acid fluoride and 18% 4-chlorobutyryl fluoride.

EXAMPLE III 505 parts of sulfolane were heated to 200° C. and 100 parts of potassium fluoride (1.72 moles) were added thereto. Vigorous stirring was commenced and 100 parts (0.71 mole) of 4-chlorobutyryl chloride were added over a period of 20 minutes. The low boiling product was distilled off, recovering 43.4 parts of cyclopropanecarboxylic acid fluoride, which was identified by infrared spectrography. This was a yield of 69.5%.

EXAMPLE IV 100 parts of potassium fluoride (1.72 moles) were added to 441 parts of hot (130° C.) sulfolane and 100 parts (0.71 mole) of 4-chlorobutyryl chloride were added thereto fairly rapidly over a 10–15 minute period. The temperature was gradually raised from 130° C. At 191° C. distillation began. It ended at 203° C. Thus recovered were 55 parts of a mixture of cyclopropanecarboxylic acid fluoride and 4-chlorobutyryl fluoride with the former predominating to the extent of about 82%.

EXAMPLE V 50 parts (0.27 mole) of 4-bromobutyryl chloride were slowly added to a vigorously stirred mixture of 100 parts (1.72 moles) of potassium fluoride in 515 parts of N-methyl-2-pyrrolidone kept at 195–200° C. Vigorous reflux soon began. The mixture was stirred rapidly throughout the reaction. Reflux was maintained for 4 hours and all volatile material was removed through a distilling head. The crude material thus obtained was redistilled and 5.5 parts of material was obtained, which was identified by it N.M.R. spectrum as cyclopropanecarboxylic acid fluoride.

EXAMPLE VI 378 parts of dry sulfolane were heated to 130° C. in a reaction vessel fitted with a stirrer, addition funnel, thermometer, takeoff head and condenser. 100 parts (0.66 mole) of cesium fluoride, finely powdered and dried at 190° C., were added to the sulfolane. 53.5 parts (0.38 mole) of 4-chlorobutyryl chloride were then added to the mixture and the temperature was raised until distillate started to come over. Nothing came over until 190°–195° C. 27.3 parts of distillate were collected between 195 and 205° C. A mixture of about 85% cyclopropanecarboxylic acid fluoride with about 15% 4-chlorobutyryl fluoride was obtained.

EXAMPLE VII

Six hundred thirty three parts of sulfolane were introduced into a reaction vessel equipped with a high speed stirrer, thermometer, takeoff head, addition funnel and nitrogen gas sweep. The vessel was heated with stirring to 195–200° C. while using the nitrogen sweep. 159 parts (2.74 moles) of potassium fluoride, finely ground and dried at 170° C., were added to the sulfolane. 100 parts (0.71 mole) of 4-chlorobutyryl chloride were then added to the mixture dropwise over 20 minutes. The temperature of the vessel rose over a 5–10 minute period from 201° C. and after 10 minutes a colorless distillate began collecting. A total of 39.4 parts of distillate was thus collected. Another 16.3 parts of distillate were collected by distilling under a slight vacuum. The total yield was 89.2% of theory. Distillation of the crude product from a small amount of sodium fluoride in a Vigreux column yielded 44 parts of cyclopropanecarboxylic acid fluoride, boiling point 81°, $N_D^{25}$ 1.3775.

EXAMPLE VIII 100 parts (1.72 moles) of potassium fluoride were added to 410 parts of sulfolane maintained in a reaction vessel at a temperature of 130° C. 100 parts (0.71 mole) of 4-chlorobutyryl chloride were then added slowly to the reaction vessel with vigorous agitation. An exothermic reaction took place raising the temperature in the reaction vessel to 139° C. When the addition had been completed the temperature reverted to 130° C. The reaction mixture was stirred vigorously for two hours at 130° C. using a nitrogen sweep with a condenser in the takeoff position. The pressure in the system was then reduced to 150 mm. Hg at a temperature of 130° C. and 47 parts of distillate were collected. This distillate was identified from its infrared and proton N.M.R. spectra as 4-chlorobutyryl fluoride.

EXAMPLE IX 410 parts of sulfolane and 100 parts (1.72 moles) of potassium fluoride were added to a reaction vessel. The temperature of the reaction mixture was stabilized at 130° C. and 100 parts (0.71 mole) of 4-chlorobutyryl chloride were added to the reaction vessel. As the acid chloride was being added the temperature rose to 139° C. and it reverted to 130° C. after addition. The mixture was stirred vigorously at 130° C. for two hours. The product was distilled off at about 150 mm. Hg, thus obtaining 47 parts of a material which was identified by infrared spectrography as 4-chlorobutyryl fluoride. There was no trace of cyclopropanecarboxylic acid fluoride. The yield was 52.8% based on 100 g. 4-chlorobutyryl chloride.

EXAMPLE X

A reaction vessel was fitted with a dropping funnel, thermometer, takeoff head, condenser, and high speed stirrer. 315 parts of sulfolane and 79.9 parts (1.37 moles) of potassium fluoride which had been dried overnight at 160° C. were placed in the reaction vessel. The temperature was raised to 202° C. 49.8 parts (0.35 mole) of 4-chlorobutyryl chloride were added to the reaction vessel over a 40 minute period. The temperature rose to 207° C. upon initial addition but dropped to 185° C. during the course of addition. After addition the temperature was adjusted to 195° C. The reaction mixture had changed in color from pale yellow to dark brown. No clear colorless distillate came over. The temperature of the reaction mixture was raised to 230° C. 2.7 parts of light brown distillate indicative of cyclopropanecarboxylic acid fluoride were collected.

EXAMPLE XI 252.6 parts (4.3 moles) of potassium fluoride were finely ground, dried in an oven at 165° C. for two days, and added to 945 parts of sulfolane in a reaction vessel. To the resulting slurry were added dropwise 101.2 parts (0.72 mole) of 4-chlorobutyryl chloride. The takeoff from the reaction vessel led to a first trap submerged in an ice water bath and then to a second trap submerged in a Dry Ice-acetone bath. 43.7 parts of clear light brown liquid were collected in the ice bath over 5 grams of dried potassium fluoride. 2.2 parts of clear colorless liquid were collected in the Dry Ice bath. Gas chromatography showed the ice water bath distillate to consist of 80.3% cyclopropanecarboxylic acid fluoride and 19.7% 4-chlorobutyryl fluoride. The Dry Ice distillate contained 99% cyclopropanecarboxylic acid fluoride and a corresponding 1% 4-chlorobutyryl fluoride.

EXAMPLE XII 249 parts (4.3 moles) of potassium fluoride and 94.5 parts (0.67 mole) of 4-chlorobutyryl chloride were added to 315 parts of sulfolane in the manner described in the previous example. Distillate was collected over 5.5 parts of dried potassium fluoride. 59.3 parts of clear very light brown liquid was collected in the ice water trap and 5.6 parts of colorless liquid were collected in the Dry Ice-acetone trap. Analysis showed the ice water distillate to contain 98.7% cyclopropanecarboxylic acid fluoride.

EXAMPLE XIII 499 parts (8.6 moles) of dried potassium fluoride and 200.5 parts (1.42 moles) of 4-chlorobutyryl chloride were added to 945 parts of sulfolane in the manner described in Example XI. 114.7 parts of cloudy essentially colorless distillate were collected in the ice water cooled trap and 10.3 parts of colorless clear liquid were collected in the Dry Ice cooled trap. Analysis showed the ice water trap distillate to contain about 94% cyclopropanecarboxylic acid fluoride and the Dry Ice trap distillate to contain about 98% cyclopropanecarboxylic acid fluoride.

EXAMPLE XIV 189 parts of sulfolane were placed in a reaction vessel equipped with stirrer and takeoff head. 52.4 parts (1.24 moles) of sodium fluoride were added thereto. To this were added slowly with stirring 42.4 parts (0.3 mole) of 4-chlorobutyryl chloride. The flask was then heated and vigorous stirring was applied over a period of about 2¾ hours during which the temperature was raised from about 80° C. to about 197° C. At the latter temperature some distillate came over. This distillate was filtered and distilled and 15 parts of a material having characteristics of 4-chlorobutyryl fluoride were recovered.

EXAMPLE XV 392 parts of gamma butyrolactone were heated with stirring to 195° C. under a nitrogen blanket. 145 parts (2.5 moles) of potassium fluoride were added and then 100 parts (0.71 mole) of 4-chlorobutyryl chloride were added dropwise. At once distillate, boiling between 185 and 195° C., came over. Distillation of this crude product yielded 34 parts of a material which was identified by infrared examination as cyclopropanecarboxylic acid fluoride. This was 54.4% of the theoretical yield.

EXAMPLE XVI 390 parts of dimethyl sulfone were placed in a reaction vessel and heated to 195° C. 145 parts (2.5 moles) of potassium fluoride were added thereto followed by the slow addition of 100 parts (0.71 mole) of 4-chlorobutyryl chloride. Very soon a colorless distillate began to collect. The reaction temperature was 195 to 205° C. Analysis of the distillate showed only cyclopropanecarboxylic acid fluoride to be present.

While the invention has been described with particular reference to specific embodiments, it is to be understood that it is not to be limited thereto but is to be construed broadly and restricted solely by the scope of the appended claims.

We claim:

1. A process for preparation of cyclopropanecarboxylic acid fluoride which comprises the steps of:
   (a) reacting an alkali metal fluoride selected from the group consisting of potassium, cesium, rubidium and sodium fluoride with a halobutyryl halide compound having the formula $X(CH_2)_3COX'$, where X and X' are halogens independently selected from the group consisting of chlorine and bromine, at a temperature between 100° C. and 189° C. to yield a compound having the formula $X(CH_2)_3COF$, wherein X is as defined above,
   (b) reacting said $X(CH_2)_3COF$ compound with an alkali metal fluoride selected from the group consisting of potassium, cesium and rubidium fluoride at a temperature between 190° C. and 240° C. to form a reaction mixture containing cyclopropanecarboxylic acid fluoride, and
   (c) recovering the cyclopropanecarboxylic acid fluoride from the reaction mixture.

2. The process of claim 1 wherein said alkali metal fluoride in each of steps (a) and (b) is potassium fluoride.

3. The process of claim 1 wherein said alkali metal fluoride in each of steps (a) and (b) is cesium fluoride.

4. The process of claim 1 wherein said alkali metal fluoride in each of steps (a) and (b) is rubidium fluoride.

5. The process of claim 1 wherein said halobutyryl halide is 4-chlorobutyryl chloride.

6. The process of claim 1 wherein said halobutyryl halide is 4-bromobutyryl chloride.

7. The process of claim 1 wherein the recovery of cyclopropanecarboxylic acid fluoride comprises distillation of the cyclopropanecarboxlic acid fluoride from the reaction mixture.

8. The process of claim 7 wherein said distillation further comprises the use of a nitrogen sweep.

9. The process of claim 1 wherein step (a) is carried out at a temperature between about 130° to 140° C. and step (b) is carried out at a temperature in the range from about 195 to 205° C.

10. The process of claim 1 wherein the mole ratio of halobutyryl halide to alkali metal fluoride in step (a) is in the range from about 1:1 to about 1:5 and wherein the mole ratio of halobutyryl fluoride to alkali metal fluoride of step (b) is in the range from about 1:2 to about 1:10.

11. The process of claim 10 wherein the mole ratio range of step (a) is between about 1:2 and 1:3 and the mole ratio range of step (b) is within the range from about 1:3 to about 1:6.

12. The process of claim 1 wherein steps (a) and (b) are carried out in a solvent selected from the group consisting of sulfolane, N-methyl-2-pyrrolidone, γ-butyrolactone and dimethyl sulfone.

13. The process of claim 12 wherein the solvent is sulfolane.

14. The process of claim 12 wherein the solvent is N-methyl-2-pyrrolidone.

15. A process for preparation of cyclopropane-carboxylic acid fluoride which comprises the steps of:
   (a) reacting an alkali metal fluoride selected from the group consisting of potassium, cesium, rubidium and sodium fluoride with a halobutyryl halide compound having the formula $X(CH_2)_3COX'$, where X and X' are halogens independently selected from the group consisting of chlorine and bromine at a temperature above at least 190° C. to form a reaction mixture containing cyclopropane-carboxylic acid fluoride, and
   (b) recovering the cyclopropanecarboxylic acid fluoride from the reaction mixture.

16. The process of claim 15 wherein the mole ratio range of halobutyryl halide to alkali metal fluoride is in the range from about 1:2 to about 1:10.

17. The process of claim 16 wherein said mole ratio range is between about 1:3 and about 1:6.

18. The process of claim 15 wherein said alkali metal fluoride is cesium fluoride.

19. The process of claim 15 wherein said alkali metal fluoride is potassium fluoride.

20. The process of claim 15 wherein said halobutyryl halide is 4-chlorobutyryl chloride.

21. The process of claim 15 wherein said halobutyryl halide is 4-bromobutyryl chloride.

22. The process of claim 15 wherein the recovery of cyclopropanecarboxylic acid fluoride comprises distillation of the cyclopropanecarboxylic acid fluoride from the reaction mixture.

23. The process of claim 22 wherein said distillation further comprises the use of a nitrogen sweep.

24. The process of claim 15 wherein the reactions are carried out in a solvent selected from the group consisting of sulfolane, N-methyl - 2 - pyrrolidone, γ-butyrolactone and dimethyl sulfone.

25. The process of claim 24 wherein the solvent is sulfolane.

26. The process of claim 25 wherein the solvent is N-methyl-2-pyrrolidone.

References Cited

UNITED STATES PATENTS 3,294,833    12/1966    Phillips _____ 260—468

OTHER REFERENCES

Lovelace et al.: Aliphatic Fluorine Compounds, p. 2, QD181F1.L6.

JAMES A. PATTEN, Primary Examiner

E. J. GLEIMAN, Assistant Examiner